(12) United States Patent
Tovey et al.

(10) Patent No.: US 11,266,256 B2
(45) Date of Patent: Mar. 8, 2022

(54) EXPENDABLE SERVICE SURFACE DEVICE

(71) Applicant: Walmart Apollo, LLC, Bentonville, AR (US)

(72) Inventors: David G. Tovey, Rogers, AR (US); Todd Franke, Bentonville, AR (US); Sam Cohagan, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/123,562

(22) Filed: Dec. 16, 2020

(65) Prior Publication Data

US 2021/0177162 A1 Jun. 17, 2021

Related U.S. Application Data

(60) Provisional application No. 62/949,148, filed on Dec. 17, 2019.

(51) Int. Cl.

| | |
|---|---|
| *A47F 5/00* | (2006.01) |
| *A47B 49/00* | (2006.01) |
| *A47B 46/00* | (2006.01) |
| *A47F 3/08* | (2006.01) |
| *A47F 3/11* | (2006.01) |

(Continued)

(52) U.S. Cl.
CPC .......... *A47F 5/0093* (2013.01); *A47B 46/005* (2013.01); *A47B 49/002* (2013.01); *A47B 49/008* (2013.01); *A47B 63/065* (2013.01); *A47F 3/085* (2013.01); *A47F 3/11* (2013.01); *A47F 5/0087* (2013.01); *A47F 5/025* (2013.01);

(Continued)

(58) Field of Classification Search
CPC ........ A47F 5/0093; A47F 5/0227; A47F 3/08; A47F 3/085; A47F 3/10; A47F 3/11; A47F 5/025; A47F 5/0087; A47B 46/005; A47B 49/002; A47B 49/008; A47B 63/065; A47B 49/00; G01G 19/4144; G01G 19/52; G01G 21/28; B65G 1/12; B65G 1/127; A47G 23/08
USPC ......... 211/1.52–1.56, 78, 165; 312/266, 267, 312/97; 177/25.11
See application file for complete search history.

(56) References Cited

U.S. PATENT DOCUMENTS

| | | | |
|---|---|---|---|
| 1,030,898 A * | 7/1912 | Langdale | A47B 63/065 312/267 |
| 1,552,290 A * | 9/1925 | Fowler | A47F 5/03 211/131.2 |

(Continued)

FOREIGN PATENT DOCUMENTS

| | | |
|---|---|---|
| BR | 202016012547 U2 | 12/2017 |
| NL | 9001742 A | 3/1992 |

*Primary Examiner* — Jennifer E. Novosad

(57) ABSTRACT

Examples provide a height adjustable tray including a service surface for moving one or more items from a first height near the top of a display case down to a lower height within reach of a user in a seated position or otherwise unable to reach a top surface of the display case. The tray is connected to a set of one or more support arms. A gearing mechanism moves the set of support arms along a range of motion to lower the tray from the first height near the top of the display case to a position in front of the display case at a second height. The tray remains in a horizontal orientation substantially parallel to the floor or ground surface as the tray moves through the range of motion. An operating mechanism controls movement of the tray along the range of motion.

16 Claims, 13 Drawing Sheets

(51) Int. Cl.
*A47F 5/025* (2006.01)
*A47B 63/06* (2006.01)
*G01G 19/52* (2006.01)
*G01G 19/414* (2006.01)
*G01G 21/28* (2006.01)

(52) U.S. Cl.
CPC ......... *G01G 19/4144* (2013.01); *G01G 19/52* (2013.01); *G01G 21/28* (2013.01)

(56) References Cited

U.S. PATENT DOCUMENTS

| | | | | |
|---|---|---|---|---|
| 1,785,954 A * | 12/1930 | Fredericks | ............. | F25D 25/04 312/36 |
| 2,603,547 A * | 7/1952 | Zook | ................... | A47B 63/067 312/268 |
| 2,646,891 A * | 7/1953 | Morgan | ................ | B25H 3/025 211/131.2 |
| 2,856,254 A * | 10/1958 | Paulos | ................ | A47B 63/065 312/266 |
| 2,927,545 A * | 3/1960 | Hieb | ........................ | A21B 1/46 198/800 |
| 3,403,789 A | 10/1968 | La Morte et al. | | |
| 3,674,155 A * | 7/1972 | Kessler | ................... | B25H 3/00 211/1.54 |
| 3,784,024 A * | 1/1974 | Kristy | ................. | A47B 49/002 211/131.2 |
| 3,861,519 A * | 1/1975 | Ware | ................... | A47B 63/067 211/121 |
| 4,017,132 A * | 4/1977 | Banys | ................. | A47B 63/067 312/268 |
| 4,303,283 A * | 12/1981 | Mueller | ................... | A47F 3/08 108/94 |
| 4,314,647 A * | 2/1982 | Harris | ................... | B65G 1/127 198/798 |
| 4,615,430 A * | 10/1986 | Satoh | ................. | B65G 1/127 198/465.1 |
| 4,643,495 A * | 2/1987 | Pepping | ................. | B65G 1/127 198/800 |
| 4,650,264 A * | 3/1987 | Dahnert | ................ | B65G 1/127 108/22 |
| 4,676,560 A * | 6/1987 | Schmitz | ................ | B65G 1/127 312/268 |
| 5,039,180 A * | 8/1991 | Lemons | ............... | A47B 81/068 312/267 |
| 5,096,074 A | 3/1992 | Merl | | |
| 5,370,247 A * | 12/1994 | Handleman | ............. | B25H 3/00 211/164 |
| 5,697,588 A | 12/1997 | Gonzalez et al. | | |
| 5,909,013 A * | 6/1999 | Dlugos | ................ | G01G 19/005 177/25.11 |
| 5,924,580 A * | 7/1999 | Chase | ................ | A61G 13/0027 211/131.2 |
| 5,971,512 A * | 10/1999 | Swan | ....................... | B25H 1/10 211/131.1 |
| 6,357,609 B1 | 3/2002 | Van Noord et al. | | |
| 6,794,586 B1 * | 9/2004 | Mason | ............... | G01G 19/4144 177/185 |
| 6,854,815 B1 * | 2/2005 | Smith | ................... | A47B 49/008 198/802 |
| 7,635,246 B2 * | 12/2009 | Neeper | ........... | G01N 35/00732 414/280 |
| 7,743,930 B2 * | 6/2010 | Krohn | ...................... | A47F 3/11 211/1.51 |
| 7,811,042 B1 * | 10/2010 | Menendez | ............ | B65G 1/127 414/331.04 |
| 7,858,888 B2 * | 12/2010 | Lucas | .................... | G01G 19/12 177/136 |
| 7,985,043 B2 * | 7/2011 | Cook | ................... | B62D 53/062 414/426 |
| 8,292,095 B2 | 10/2012 | Howlett | | |
| 8,505,753 B2 | 8/2013 | Clark et al. | | |
| 8,955,699 B2 * | 2/2015 | Wilder | ................... | B25H 3/025 211/77 |
| 9,326,599 B1 * | 5/2016 | Sowers | ............ | A47B 49/008 |
| 10,154,756 B2 * | 12/2018 | Hall | ....................... | A47J 43/04 |
| 10,849,425 B2 * | 12/2020 | Esposito | ................ | A47B 46/00 |
| 2004/0079620 A1 * | 4/2004 | Aleshire | ............ | A47B 63/067 198/711 |
| 2004/0169448 A1 * | 9/2004 | Malizia | ................... | A47F 3/085 312/116 |
| 2007/0007078 A1 * | 1/2007 | Johnson | ................... | A47F 9/047 186/61 |
| 2009/0107734 A1 * | 4/2009 | Lucas | .................... | G01G 1/243 177/25.11 |
| 2012/0055982 A1 * | 3/2012 | Edwards | ............ | G01G 19/4144 235/375 |
| 2015/0068821 A1 * | 3/2015 | Dillon | ................... | G01G 19/52 177/1 |
| 2018/0110330 A1 * | 4/2018 | Hall | ...................... | A47B 49/008 |
| 2018/0263368 A1 * | 9/2018 | Galles | ................ | A47B 81/00 |
| 2019/0090420 A1 * | 3/2019 | Advani | ................ | A01D 61/00 |
| 2021/0022526 A1 * | 1/2021 | Gupta | ................ | G01G 19/4144 |
| 2021/0148750 A1 * | 5/2021 | Trakhimovich | ...... | G06Q 10/087 |
| 2021/0177162 A1 * | 6/2021 | Tovey | ................... | A47B 49/002 |

* cited by examiner

EXPENDABLE SERVICE SURFACE DEVICE

BACKGROUND

Counters and display cases in restaurants, shops and grocery stores are typically built such that products placed on the top surface of the counter or case are within comfortable reach of a customer of average height in a standing position. However, some customers may be in a wheelchair, motorized cart or other mobility assistance device which prevents them from reaching the top of the counter or case. Likewise, other customers of below average height may also be unable to comfortably reach items placed on top of a typical counter. Display cases can be built with a lower top surface height to accommodate these customers. However, this reduces volume within the display case for storing and/or displaying products. This results in inefficient utilization of space.

SUMMARY

Some examples provide a system for extending a height adjustable service surface. A display case includes a side panel, a top panel and a front panel. A gearing mechanism is mounted to the side panel. The gearing mechanism includes a set of gears and an operating mechanism associated with the gearing mechanism. A set of support arms configured to rotate along a range of motion are mounted to the gearing mechanism. An attachment member is associated with a first end of each arm in the set of support arms. A horizontal top surface of the tray is configured to support a set of items at least partially in contact with the top surface. The tray moves along the range of motion from a first position at a first height near the top panel of the display case to a second position at a second height associated with a stop point in front of the front panel. When the operating mechanism is activated by a first user positioned behind the display case, the gearing mechanism moves the tray along the range of motion from the first position to the second position maintaining the horizontal top surface parallel to the ground or floor.

Other examples provide an extendable service surface device for adjusting height of a tray. A gearing mechanism is mounted to a display case. An operating mechanism is associated with the gearing mechanism. A tray support mechanism includes two tray support arms. The arms attach to the gearing mechanism at one end and attach to the side of the tray at another end. The support arm(s) rotate along a range of motion moving the tray from a first position at a first height to a second position at a lower, second height. A top surface of the tray remains horizontal and parallel to a ground surface, stably supporting a set of items resting or sitting on the top surface as the tray moves along the range of motion.

Still other examples provide an extendable service surface device for adjusting the height of a tray. A gearing mechanism is mounted to a display case. The gearing mechanism includes a set of gears. An operating mechanism is associated with the gearing mechanism. A triangular support member connects to a first side of the tray. The triangular support member is attached to a first end of a support arm. The tray hangs from the support arm via the triangular support member. A top surface of the tray is configured to support one or more items as the tray moves along a range of motion from a first position at a first height to a second position at a second height in front of the front panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable an extendable service surface device that moves from a default position along a range of motion to an extended position at a lower height within reach of a user in a seated position or otherwise unable to reach the top of a display case. After the user removes the items from the tray, the device rotates the tray back up to the default position.

Figure 1:
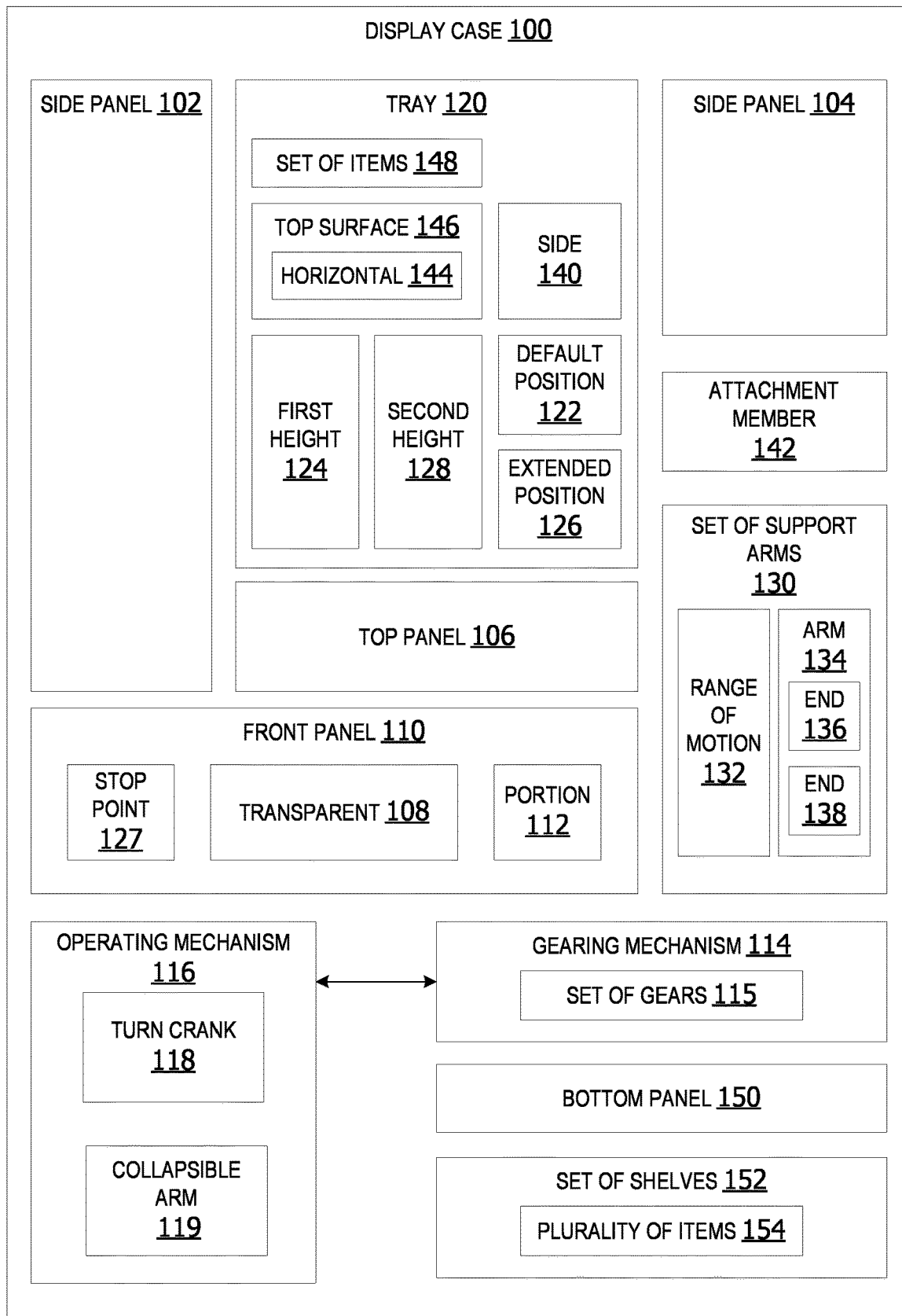
FIG. 1 is an exemplary block diagram illustrating a display case including an extendable service surface.

FIG. 1 is an exemplary block diagram illustrating a display case 100 including an extendable service surface. The display case 100 includes a side panel 102 and a side panel 104. The display case 100 can also include a top panel 106. In this non-limiting example, at least a portion 112 of the front panel 110 is transparent 108 or a substantially transparent front panel 110.

A gearing mechanism 114 is mounted to a portion of the display case 100. In this example, the gearing mechanism 114 is mounted to an exterior surface of the side panel 104. However, examples are not limited to mounting on the exterior surface of the side panel 104. In other examples, the gearing mechanism may be mounted to another portion of the display case.

In some examples, the gearing mechanism 114 includes a set of one or more gears in a set of gears 115. In other non-limiting examples, the gearing mechanism includes an electric motor.

An operating mechanism 116 is associated with the gearing mechanism 114 in some examples. The operating mechanism 116 is utilized by a user, such as an employee of a store, restaurant of other retail environment.

In some examples, the operating mechanism 116 includes a turn crank. The user turns or rotates the turn crank clockwise to lower a tray 120 from a default position 122 at a first height 124 near the top panel 106 downward to an extended position 126 at a lower, second height 128.

In some examples, the user rotates the turn crank 118 counterclockwise to raise the tray 120 from the extended position 126 back up to the default position 122. In these examples, the user rotates or turns the turn crank 118 counterclockwise to lower the tray 120 to the extended position. The user rotates the turn crank 118 clockwise to raise the tray 120 back up to default position 122.

However, the examples are not limited to rotating clockwise to lower the tray and counterclockwise to raise the tray. In other examples, the crank is turned counterclockwise to lower the tray and clockwise to raise the tray back to the default position.

In yet other examples, the turn crank 118 is attached to a collapsible arm 119. The collapsible arm 119 connects the turn crank to the gearing mechanism. The collapsible arm 119 can be extended to a full extension length or collapsed back into a default position to minimize the turn crank 118 profile and to reduce the amount of space taken by the turn crank. The collapsible arm 119 can be implemented as a rod, arm, rigid bar, shaft or other rigid support member connecting the turn crank to the gearing mechanism.

The collapsible arm 119, in other examples, is extended to a fully extended position providing additional space and/or leverage for a user to turn the crank. The collapsible arm 119 can collapse or retract to minimize the length of the arm. In some examples, the collapsible arm 119 is a telescoping arm outward or collapses inward to adjust the length of the arm. The collapsible arm 119 can include a locking mechanism to secure the arm in either the extended position or the collapsed position.

In other examples, the collapsible arm contains one or more segments which are capable of nesting within one or more other segments to extend or retract the arm (change the arm length). In these examples, at least one segment of the collapsible arm is hollow permitting at least one other segment of the arm to nest within the hollow segment permitting the arm to retract or nest to shorter the length of the arm.

In yet other examples, the collapsible arm is capable of retracting into a housing within the counter and/or within the gearing mechanism. A portion of the collapsible arm retracts into the housing to the minimize or shorter the length of the arm.

The collapsible arm, in still another example, is a folding or bifurcated arm. At least one segment of the collapsible arm folds or is removable. One or more segments are removed or folded to adjust the length of the body of the collapsible arm.

In still other examples, the gearing mechanism includes an electric motor. In these examples, the turn crank and collapsible arm are not included with the gearing mechanism. Instead, the gearing mechanism can be activated by a push button, a touch screen, a switch, a toggle or other control mechanism to activate an electric motor to activate rotation of the set of support arms.

A set of support arms 130 are mounted to the gearing mechanism 114. The set of support arms 130 rotate along a range of motion 132 to move a tray support arm 134 in the set of support arms 130 attached to the tray 120 at a first end 136 of the tray from the default position 122 to the extended position 126 and/or from the extended position back to the default position. The second end 138 of the support arm 134 is attached to a side 140 of the tray 120.

In some examples, an attachment member 142 connects the tray 120 to the set of support arms 130. The attachment member 142 can include a pin, bolt, clip, weld, cotter pin, or any other type of attachment device. The attachment member 142 and the set of support arms 130 work together to support the tray 120 such that a horizontal 144 top surface 146 of the tray is able to support a set of items 148 at least partially in contact with the top surface as the tray moves along the range of motion 132.

As the tray moves from the default position 122 to the extended position 126 and back to the extended position 126 associated with a stop point 127, the tray remains substantially parallel with a bottom panel 150 and/or the ground/ floor of the retail environment.

The display case 100, in some examples, includes storage/ display space for a plurality of items 154 on a set of one or more shelves 152 within the display case 100.

Figure 2:
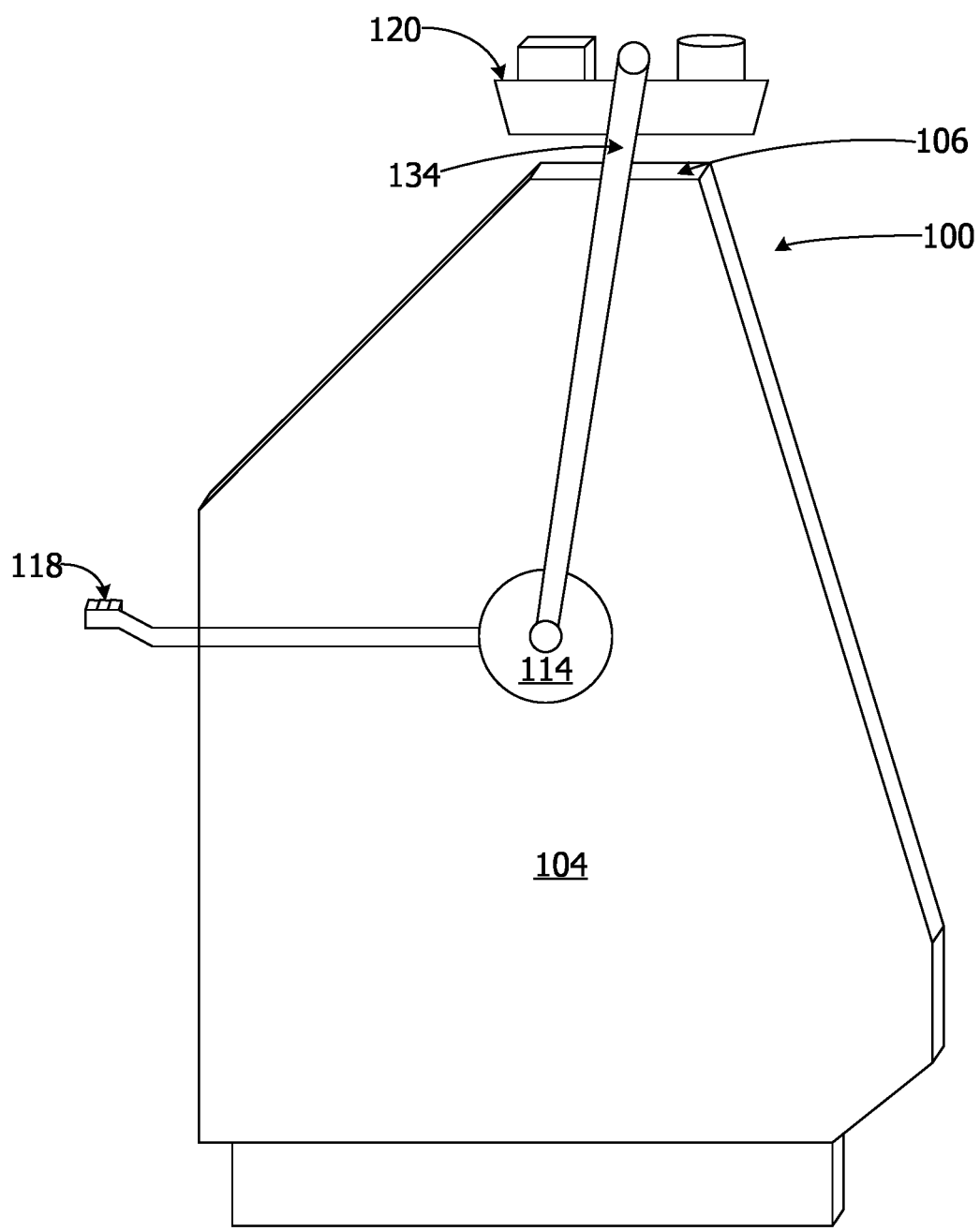
FIG. 2 is a side view illustrating an extendable service surface device including a single support arm in a default position.

FIG. 2 is a side view illustrating an extendable service surface device including a single support arm 134 in a default position. The default position is a position at or near the top panel 106. In this non-limiting example, the tray 120 hangs from the support arm 134 at approximately one or two inches above the top panel of the display case 100.

In this example, a user behind the display case 100 operates the turn crank 118. As the turn crank rotates, it activates the gearing mechanism 114, which rotates the support arm 134 through a range of motion to smoothly lower the tray 120 from the default position to a stop point in front of the display case 100 within reach of a customer standing, sitting or otherwise positioned in front of the display case.

Figure 3:
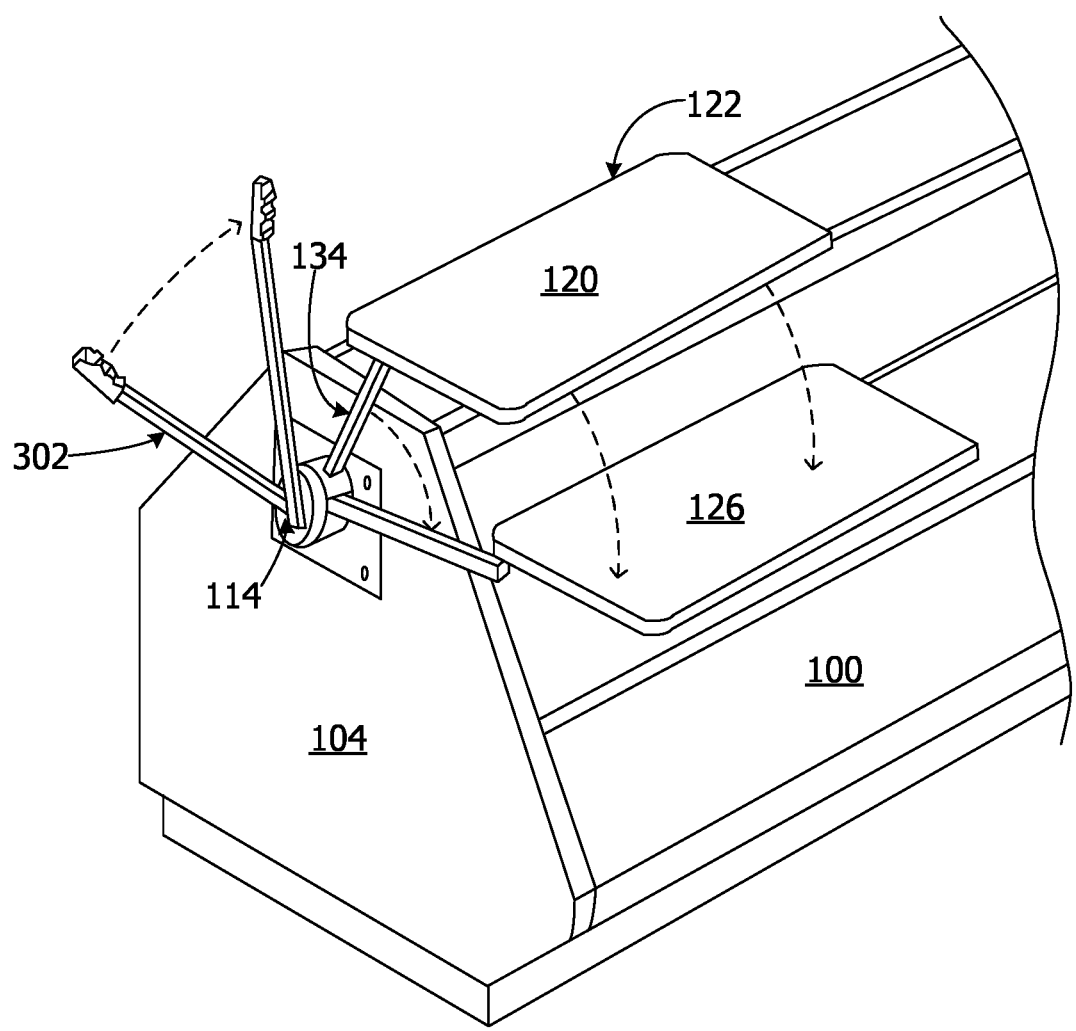
FIG. 3 is a perspective view illustrating an extendable service surface device including a single support arm moving from the default position to the extended position.

FIG. 3 is a perspective view illustrating an extendable service surface device including a single support arm moving from the default position to the extended position. In this example, the operating mechanism is a lever 302. As the user behind the display case 100 engages (moves) the lever 302 up or down, it activates the gearing mechanism 114. The gearing mechanism 114 moves the support arm 134 and tray 120 along the range of motion to the extended position 304.

In this example, the operating mechanism is engaged/activated by moving a lever up or down. In other examples, the operating mechanism is engaged/activated by moving a lever side-to-side, turning the lever/crank, pushing a button, flipping a toggle switch, turning a key, pressing an icon on a touch screen/graphical user interface (GUI), pressing one or more keys on a keyboard, giving a voice command to a voice-activated user interface, sending a signal or control command via a user device, or any other type of method for activating a device.

In still other examples, the operating mechanism is a device in the Internet of Things (IoT) having a communications interface device enabling the service surface device to receive instructions via a network, such as the Internet. The operating mechanism in this example can receive instructions to raise or lower the tray from a user device, a cloud server, a local store server, a cellular telephone, a tablet computing device or any other computing device.

Figure 4:
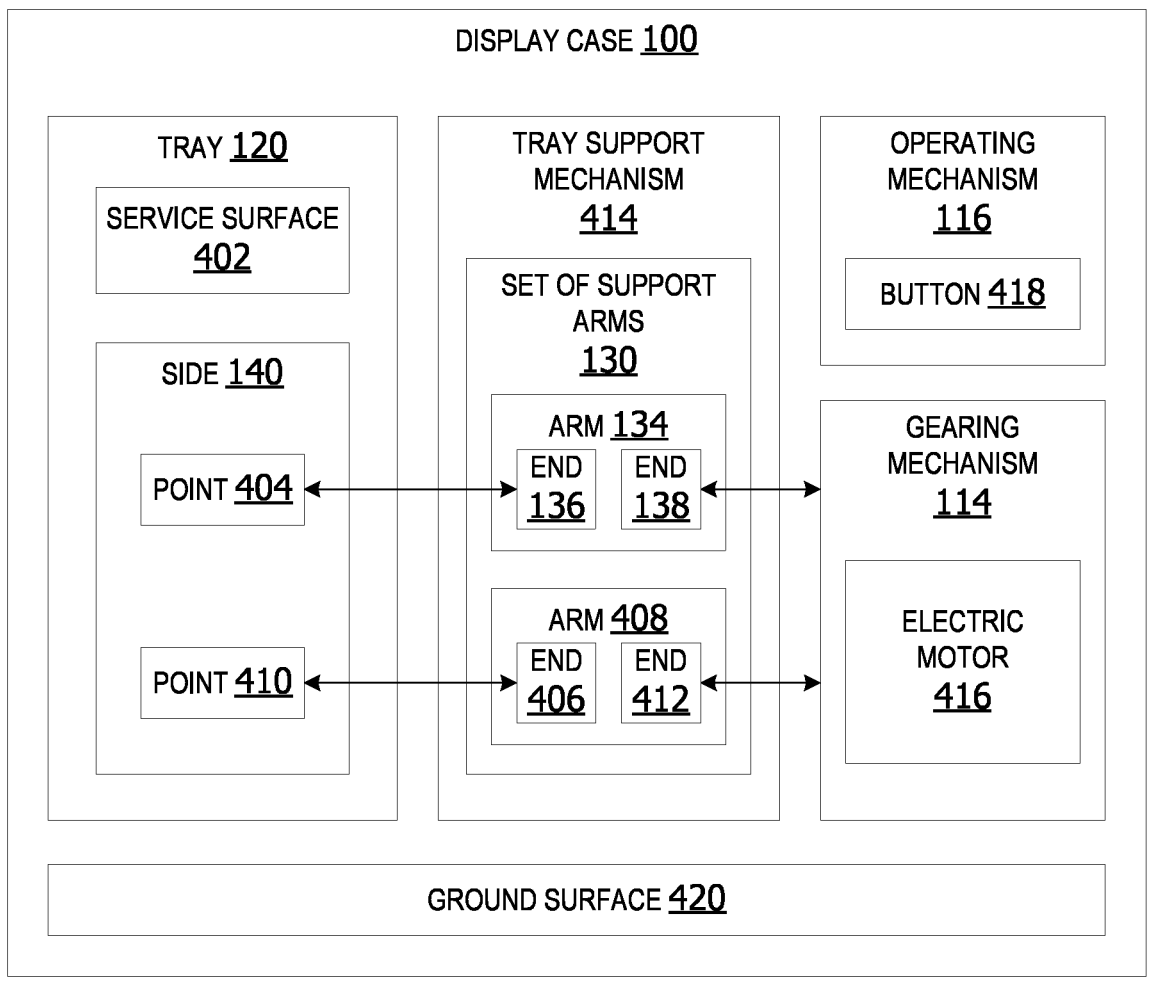
FIG. 4 is an exemplary block diagram illustrating a display case including an extendable surface device having a set of two support arms.

FIG. 4 is an exemplary block diagram illustrating a display case 100 including an extendable surface device having a set of two support arms. The tray support mechanism 414 in this example includes the set of support arms 130 which connects the operating mechanism 116 and the gearing mechanism 114.

In this non-limiting example, the service surface 402 is a horizontal top surface of the tray. A first point 404 on the side 140 of the tray 120 connects to the first end 136 of a tray support arm 134. The second end 138 of the support arm 134 connects to the gearing mechanism 114. A first end 406 of a second arm 408 connects to the side 140 of the tray 120 at a second point 410 on the side of the tray. The other end 412 of the arm 408 connects to the gearing mechanism 114.

The gearing mechanism 114 includes an electric motor 416. When the user behind the display case presses a button 418 or other control device to activate the gearing mechanism, the electric motor 416 engages to rotate the set of support arms simultaneously through the range of motion moving from the extended position to the default position. In other examples, the electric motor 416 rotates the set of support arms smoothly through the range of motion to move the tray from the default position to the extended position. The top surface of the tray remains parallel to the ground surface 420, such as the floor, throughout the range of motion.

Figure 5:
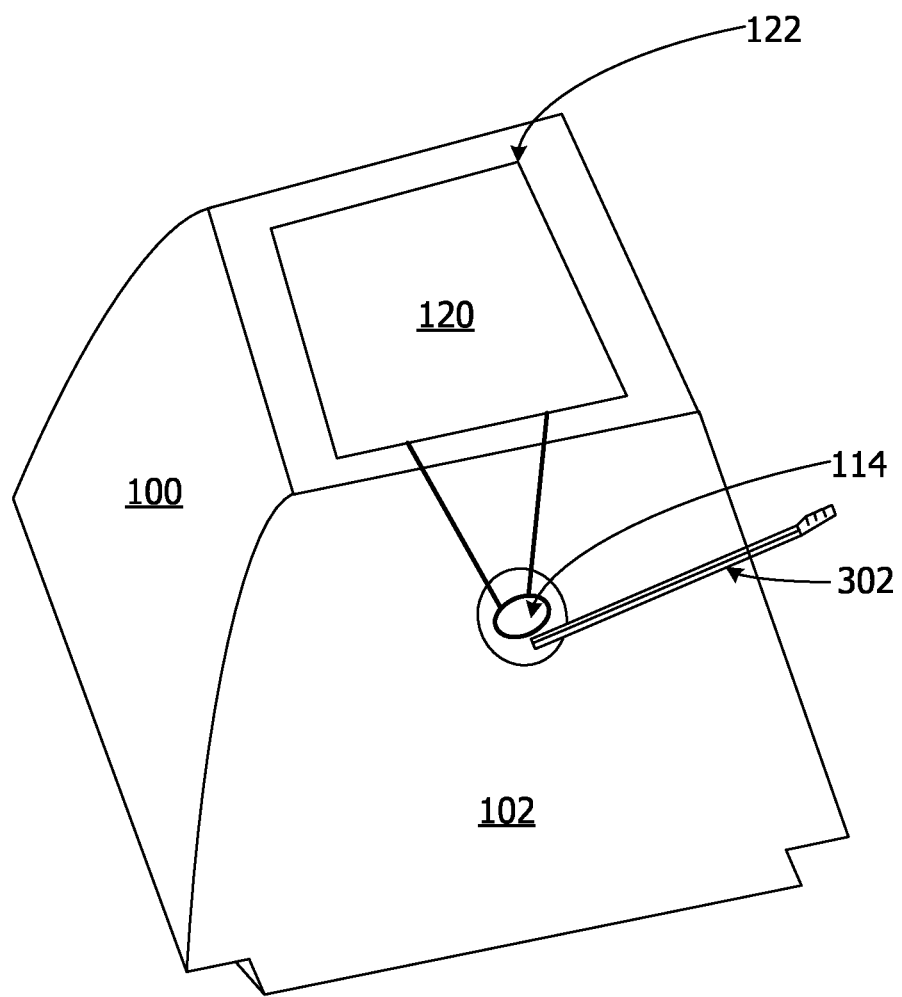
FIG. 5 is a perspective view illustrating an extendable service surface including two support arms in a default position.

FIG. 5 is a perspective view illustrating an extendable service surface including two support arms in a default position. In this example, the tray 120 is in the default position 122 associated with the top surface of the display case 100. The lever 302 is mounted to the side panel 102 associated with the display case 100. The tray in this non-limiting example is approximately thirty-six inches in length. The width of the tray 120 is between seventeen to twenty-six inches in width.

Figure 6:
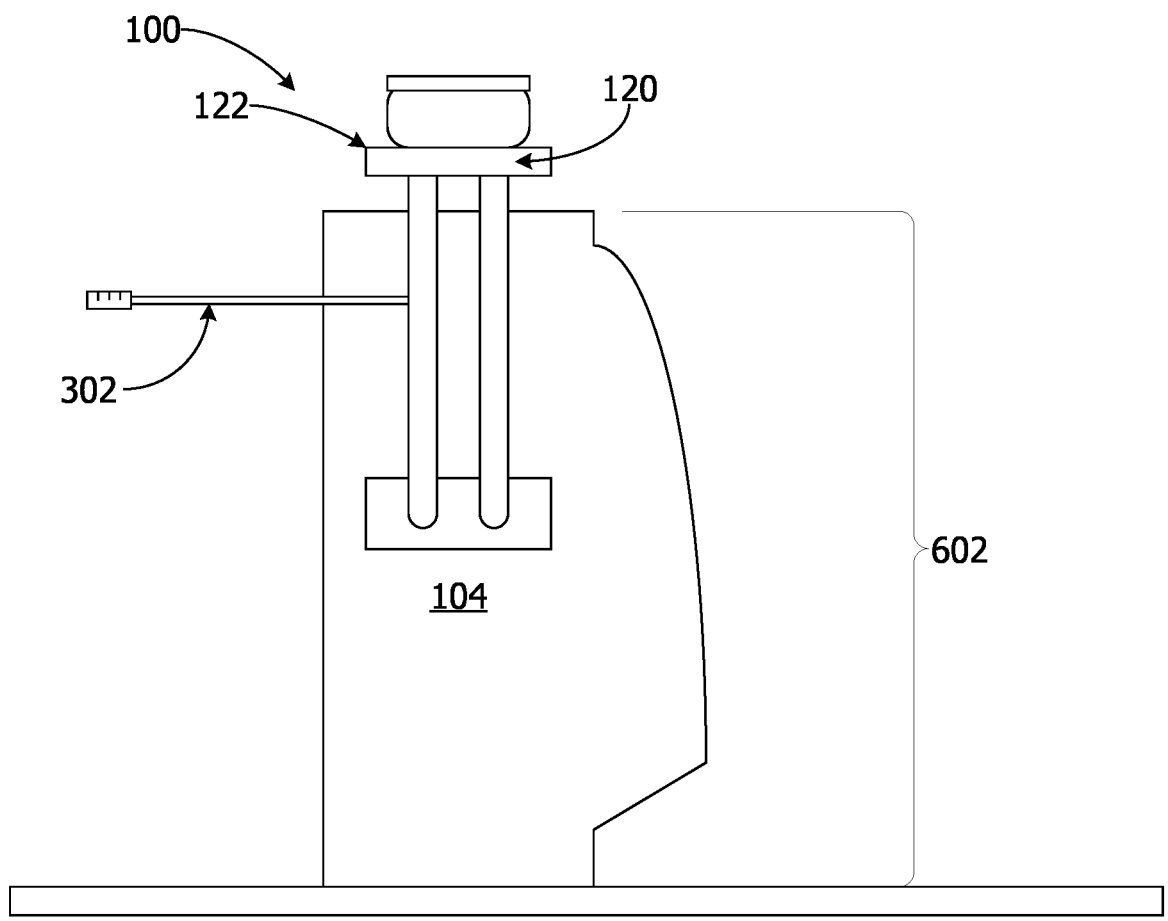
FIG. 6 is a side view illustrating a side view of an extendable service surface including two support arms in a default position.

FIG. 6 is a side view illustrating a side view of an extendable service surface including two support arms in a default position 122. The tray 120 is attached to the gearing mechanism via a pair of support arms. A lever 302 is attached to a side panel 104 of the display case. The tray 120 is located a first height 602 above the floor. The height 602 is the maximum height of the tray 120 above the floor. In some non-limiting examples, the height 602 is forty-eight inches.

Figure 7:
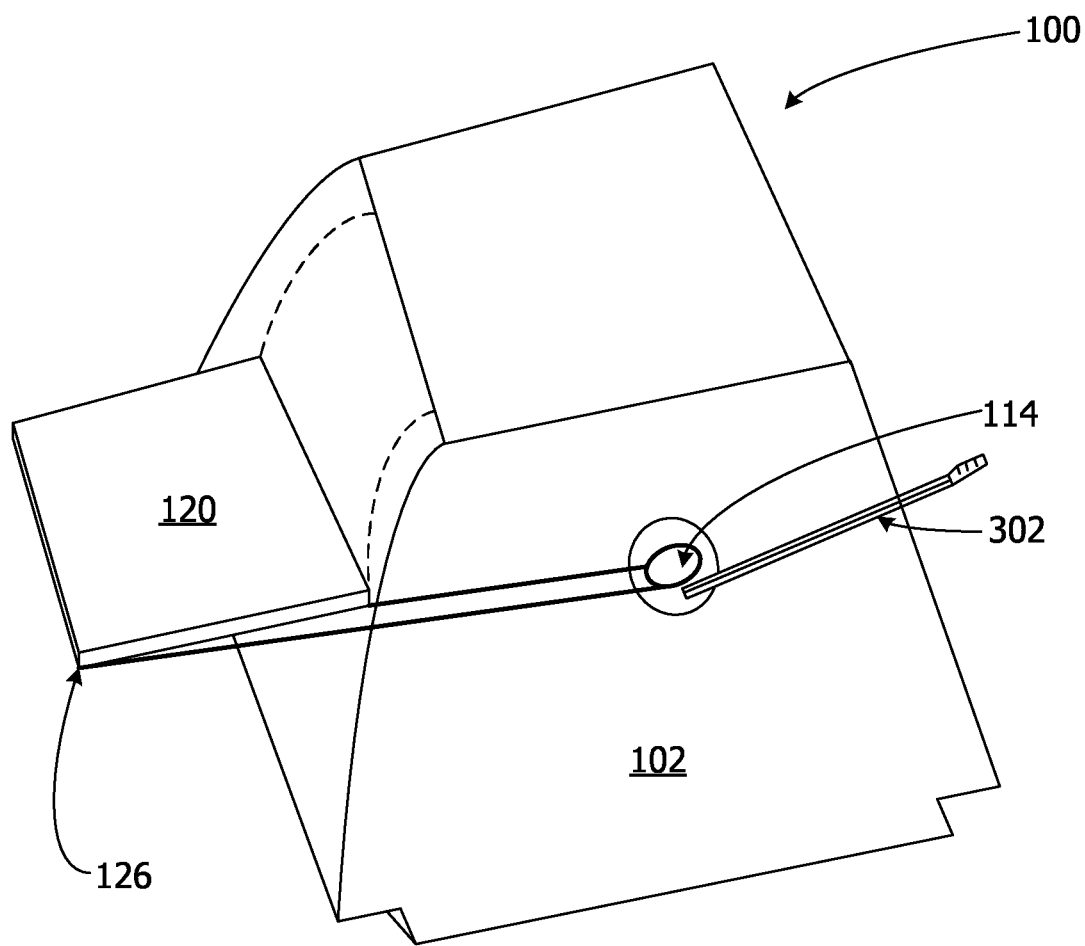
FIG. 7 is a perspective view illustrating an extendable service surface having two support arms in an extended position.

FIG. 7 is a perspective view illustrating an extendable service surface having two support arms in an extended position 126. The gearing mechanism 114, in this example, is connected to the two support arms in the extended position 126.

In this example, the two support arms form a parallelogram arm mechanism for moving an extendable service surface to present products, forms and other materials from a service to a customer. The parallelogram arm mechanism mounts to the side of the product display case or from the top surface of a counter.

Figure 8:
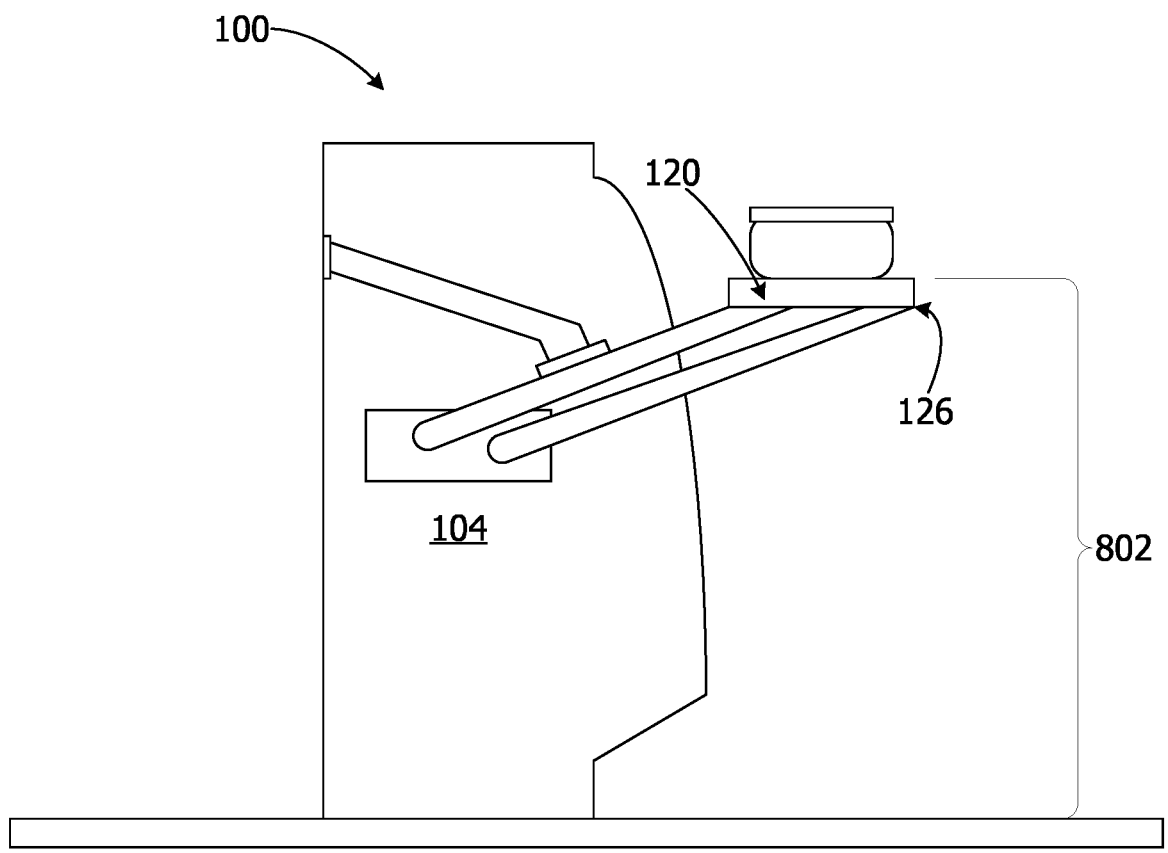
FIG. 8 is a side view illustrating a side view of an extendable service surface having two support arms in an extended position.

FIG. 8 is a side view illustrating a side view of an extendable service surface having two support arms in an extended position 126. In this example, the two support arms are parallel to each other. The tray (shelf) attaches at two points to the support arms to create a more rigid, stable orientation of the tray as it moves through the range of motion. In other words, the two parallel support arms create greater stability/rigidity of the tray for improved support of items resting on the tray as the tray moves from the default position to the extended position.

The tray 120 is positioned a second height 802 above the floor or other ground surface. The height 802 is the tray's shortest distance above the floor/ground surface in this example. In the extended position, the tray is positioned in front of the front panel of the display case 100.

Figure 9:
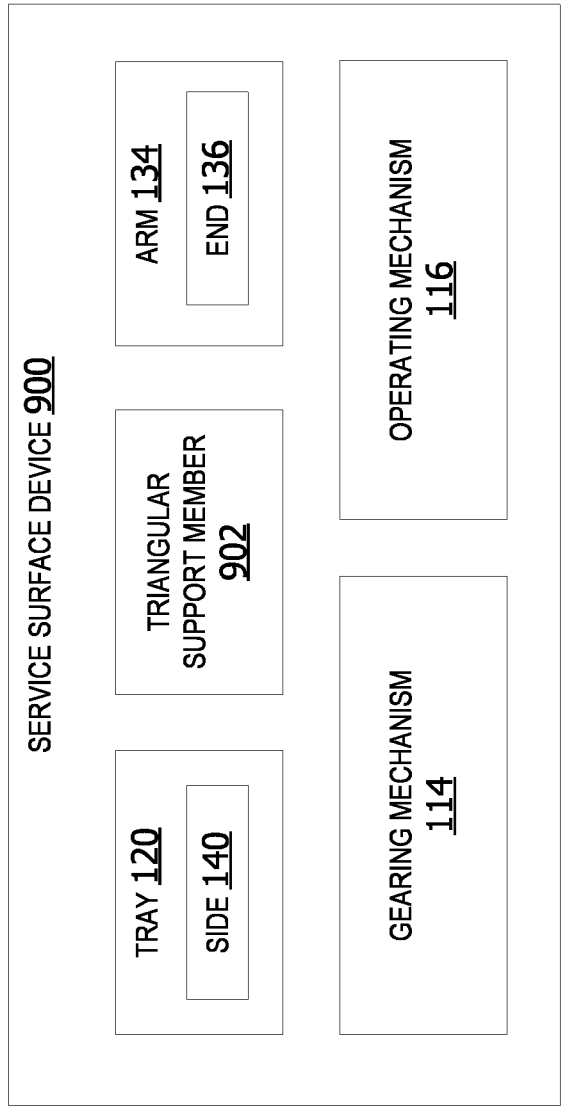
FIG. 9 is an exemplary block diagram illustrating a service surface device including a triangular support member.

FIG. 9 is an exemplary block diagram illustrating a service surface device 900 including a triangular support member 902. The service surface device 900 includes the gearing mechanism 114 connected to the operating mechanism 116. The triangular support member 902 is connected to the one side 140 of the tray 120. The triangular support member 902 is connected to the first end 136 of the tray support arm 134. The tray hangs from the tray support member 902 as the support arm 134 rotates up and down through the range of motion.

Figure 10:
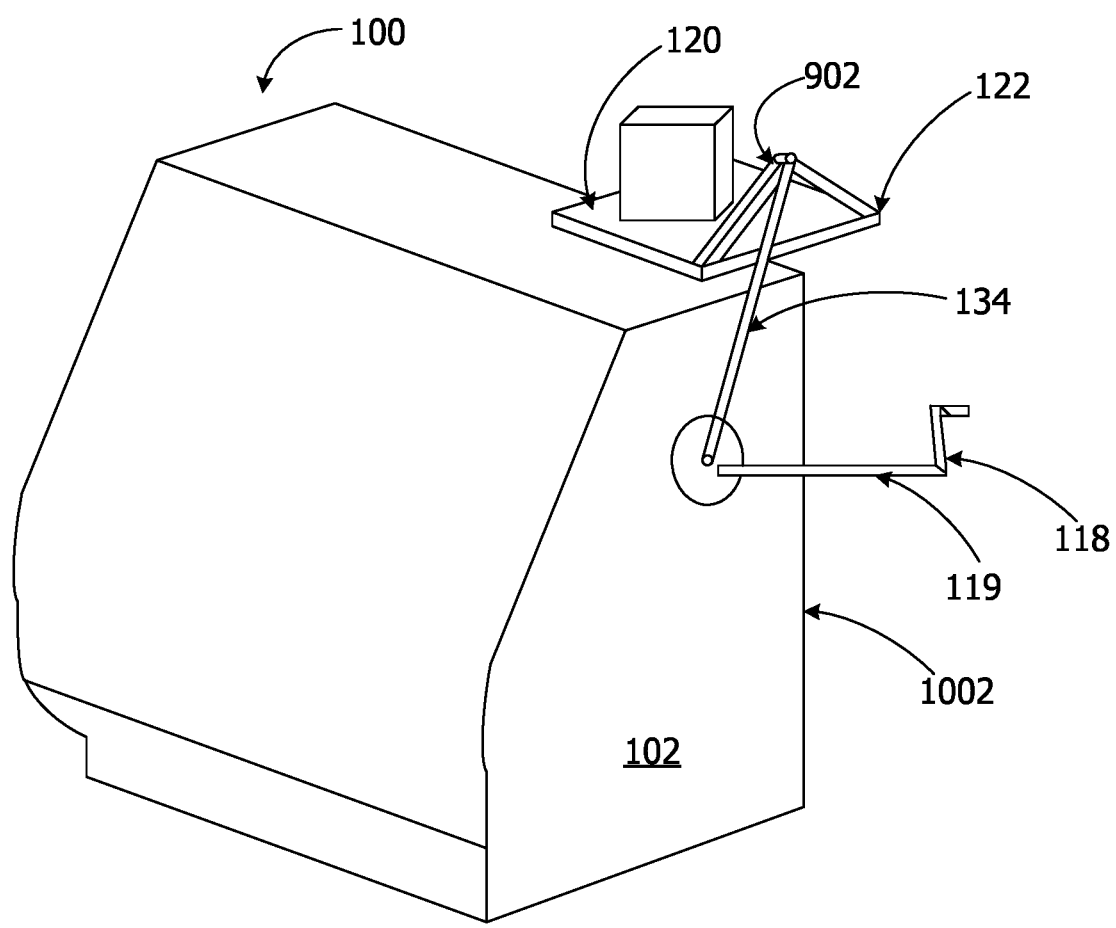
FIG. 10 is a perspective view illustrating a service surface device having a triangular support member in a default position.

FIG. 10 is a perspective view illustrating a service surface device having a triangular support member 902 in a default position 122. In this example, the operating mechanism is turn crank 118 mounted to the side panel 102 of the display case. In other examples, the turn crank is mounted to a collapsible arm 119 that is mounted to the back 1002 of the display case. The collapsible arm 119, in this example, is extended to a full length to provide a user with greater leverage and more space (increased distance from the back 1002 of the display case) to operate the turn crank 118 without contacting the display case.

The collapsible arm 119 can be collapsed when not in use to move the turn crank closer to the display case back 1002 (minimize the amount of space taken by the turn crank) and/or move the turn crank to a location which is closer to display case so as to be out of the way of user(s) moving, working or passing near the back or side of the display case.

Figure 11:
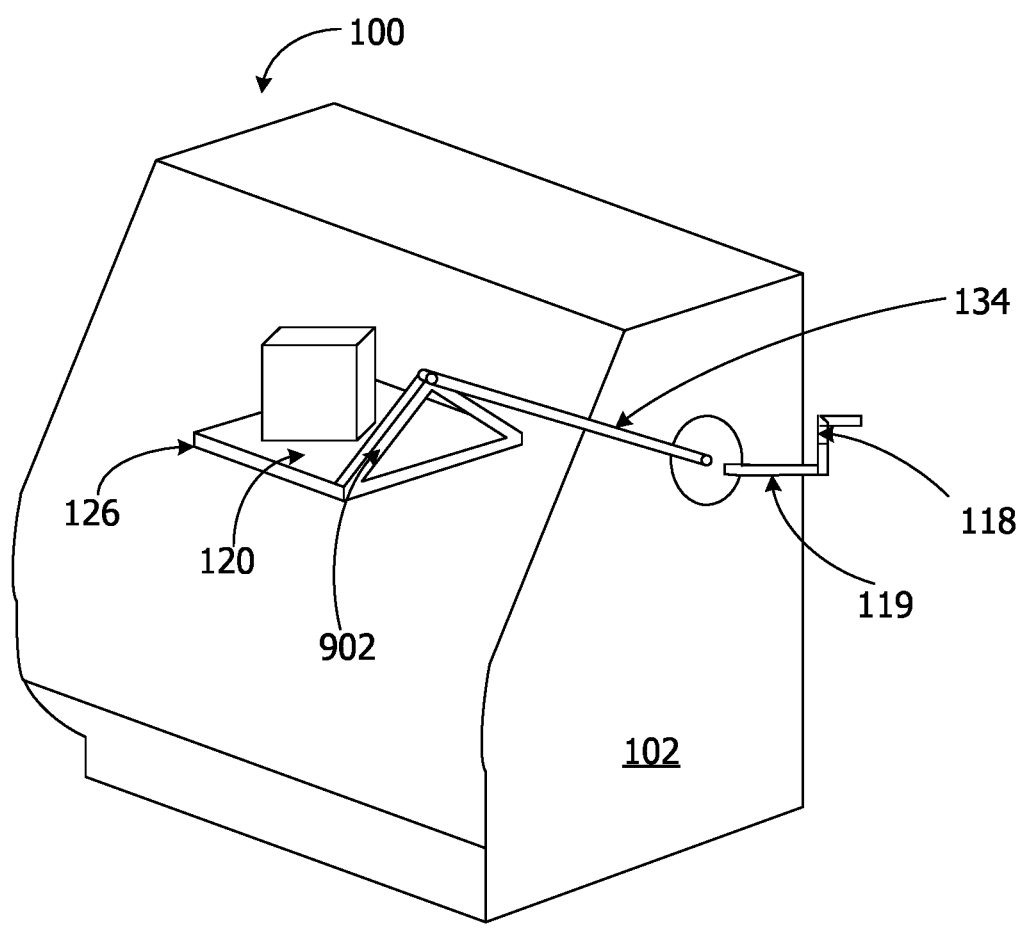
FIG. 11 is a perspective view illustrating a service surface device having a triangular support member in an extended position.

FIG. 11 is a perspective view illustrating a service surface device having a triangular support member 902 in an extended position 126. The fully extended tray 120 hangs from the triangular support member 902, which is supported on one or more arms, such as, but not limited to, the support arm 134.

The turn crank 118 in this example is connected to a collapsible arm 119. In this example, the collapsible arm 119 is collapsed or retracted into a position closer to the back of the display case (minimized distance between the crank and the display case) when the crank is not in use or when it is otherwise desirable to minimize the profile space occupied by the turn crank. The collapsible arm can be extended to increase the distance of the turn crank from the display case and gearing mechanism for increased leverage and ease of turning the crank.

Figure 12:
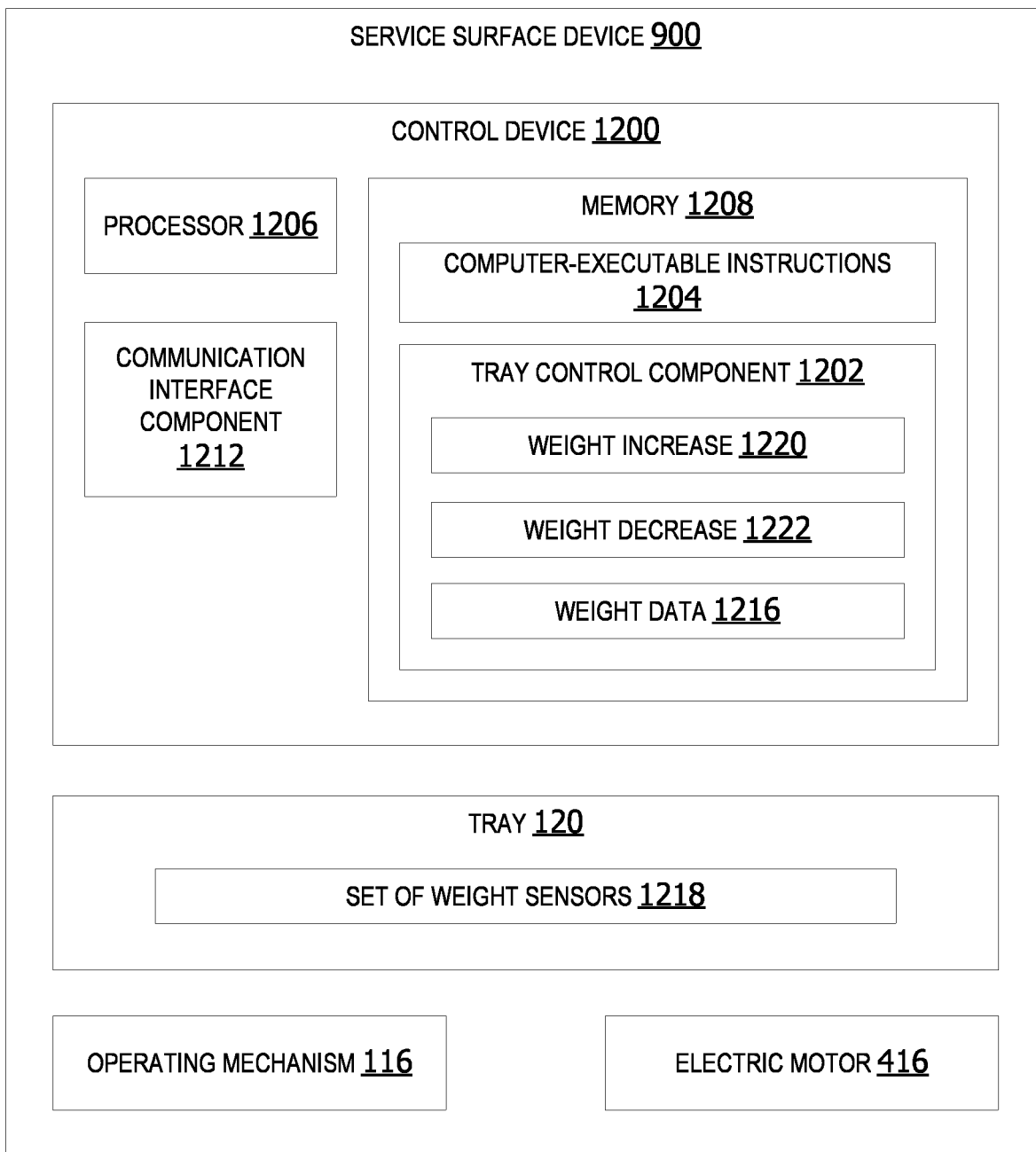
FIG. 12 is an exemplary block diagram illustrating a service surface device including a tray activation component.

FIG. 12 is an exemplary block diagram illustrating a service surface device 900 including a tray control component 1202. In the example of FIG. 1, the service surface device 900 includes a control device 1200 executing computer-executable instructions 1204 (e.g., as application programs, operating system functionality, or both) to implement the operations and functionality associated with the service surface device 900.

In some examples, the service surface device 900 has at least one processor 1206 and a memory 1208. The service surface device 900, in other examples, includes a user interface component.

The processor 1206 includes any quantity of processing units and is programmed to execute the computer-executable instructions 1204. The computer-executable instructions 1204 is performed by the processor 1206, performed by multiple processors within the control device 1200 or performed by a processor external to the service surface device 900. In some examples, the processor 1206 is programmed to execute instructions such as those illustrated in the figures (e.g., FIG. 13).

The control device 1200 further has one or more computer-readable media, such as the memory 1208. The memory 1208 includes any quantity of media associated with or accessible by the service surface device 900. The memory 1208, in these examples, is internal to the service surface device 900 (as shown in FIG. 12). In other examples, the memory 1208 is external to the service surface device 900 (not shown) or both (not shown).

The memory 1208 stores data, such as one or more applications. The applications, when executed by the processor 1206, operate to perform functionality on the service surface device 900. The applications can communicate with counterpart applications or services such as web services accessible via a network. In one non-limiting example, the applications represent downloaded client-side applications that correspond to server-side services executing in a cloud.

The network can be implemented by one or more physical network components, such as, but without limitation, routers, switches, network interface cards (NICs), and other network devices. The network is any type of network for enabling communications with remote computing devices, such as, but not limited to, a local area network (LAN), a subnet, a wide area network (WAN), a wireless (Wi-Fi) network, or any other type of network. In this example, the network is a WAN, such as the Internet. However, in other examples, the network can be a local or private LAN.

In some examples, the system optionally includes a communications interface component 1212. The communications interface component 1212 includes a network interface card and/or computer-executable instructions (e.g., a driver) for operating the network interface card. Communication between the service surface device 900 and other devices can occur using any protocol or mechanism over any wired or wireless connection. In some examples, the communications interface component is operable with short range communication technologies such as by using near-field communication (NFC) tags.

The memory 1208, in some examples, stores one or more computer-executable components, such as, but not limited to, the tray control component 1202. The tray control component 1202 analyzes weight data 1216 generated by a set of one or more weight sensors 1218 associated with the service surface device. In some examples, the set of weight sensors includes one or more weight sensors (scales) embedded within the tray and/or associated with the surface of the tray. The set of weight sensors measures the weight of any items resting on the surface of the tray 120.

The tray control component 1202 activates an electric motor 416, in some examples, to move the tray along the range of motion from the default position to the extended position in response to detecting a weight increase 1220 associated with at least one item placed on the horizontal surface. The tray control component 1202 automatically moves the tray 120 from the extended position back up to the default position in response to detecting a weight decrease based on analysis of the weight data 1216 indicating removal of one or more items from the tray. In other examples, the tray automatically returns to the default position when the weight data indicates the tray is empty (no items on the tray).

Figure 13:
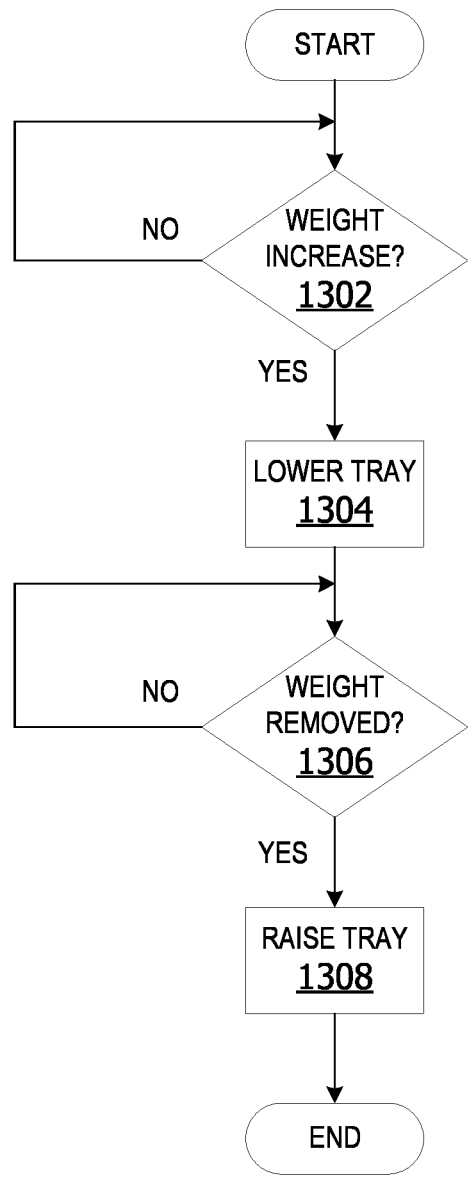
FIG. 13 is an exemplary flow chart illustrating operation of the service surface device to automatically raise or lower the service surface device based on weight data.

FIG. 13 is an exemplary flow chart illustrating a service surface device to automatically raise or lower the service surface device based on weight data. The process shown in FIG. 13 is performed by a service surface device, such as the service surface device 900 in FIG. 9.

The process begins by determining if a weight increase associated with the surface of a tray is detected at 1302. If yes, the service surface device lowers the tray from default position to the extended position at 1304. The service surface device determines whether the weight of the items resting on the surface of the tray is removed at 1306. If yes, the service surface device raises the tray back to the default position at 1308. The process terminates thereafter.

While the operations illustrated in FIG. 13 are performed by a service surface device, aspects of the disclosure contemplate performance of the operations by other entities. In a non-limiting example, a cloud service performs one or more of the operations.

ADDITIONAL EXAMPLES

In some examples, the system provides a handicap accessible arm extension for lowering items over a counter to a lower height accessible to a customer in a seated position without requiring an employee to hand the items over the case manually or carry the items around the counter. The service surface device also enables additional usable space for item storage/display within the display case. In other words, the service surface device enables accommodating disabled customers while providing adequate display space inside the case.

In an example scenario, a support arm is mounted at the end of the counter which extends a platform up and over the counter and out to the customer positioned in front of the counter. The platform is suspended from the end of the arm, keeping it level through gravity.

In another example, one or two arms are connected at top and bottom of the platform. This linkage keeps the platform level without a counterweight. The arm connects to the side of the case or the top of the case.

The service surface device enables a user working behind the counter to pass products, such as package of deli meats that have been freshly cut from the deli service, over to the customer on the other side of the counter sitting in a wheelchair or otherwise unable to reach the top of the counter. The device can attach to an existing case side or top. In some examples, the device allows a user to place the product on a horizontal surface attached to a manual extension arm using a parallelogram mechanism and an operating lever to move the product over the case to a height within reach of a sitting customer.

In some examples, a gear box holds the tray in place when the tray reaches the fully extended position. In other examples, a stop on the display case holds the tray in a stable/stopped position while the customer removes item(s) from the tray surface. In other examples, the stop on the counter provides a backup support for the tray in the fully extended position in addition to the gear box.

Alternatively, or in addition to the other examples described herein, examples include any combination of the following:

- wherein the operating mechanism is a lever which moves from a first position to a second position of the lever;
- wherein the front panel is transparent or substantially transparent enabling a user looking at the front panel to view (see) or at least partially view one or more items stored inside the display case;
- wherein the tray rotates along the range of motion as the lever moves from the first position to the second position;
- wherein the gearing mechanism includes an electric motor, wherein the electric motor engages to move the support arm along the range of motion in response to activation of the operating mechanism;
- wherein the operating mechanism is a button which engages an electric motor to automatically move the tray from the first position to the second position;
- wherein the set of support arms comprises a single support arm;
- wherein the set of support arms comprises a set of two support arms;
- wherein the attachment member includes a triangular support member connected to a first side of the tray, the triangular support member attached to the first end of the support arm;
- wherein the tray hangs from the support arm via the triangular support member;
- a first end of the first support arm attached to a first point on a first side of the tray;
- a first end of the second support arm attached to a second point on the first side of the tray;
- a set of weight sensors associated with the tray, wherein the set of weight sensors generates weight data associated with the set of items;
- a tray control component, implemented on at least one processor, the tray control component activates the gearing mechanism to move the tray along the range of motion from the first position to the second position in response to detecting an increase in weight associated with at least one item placed on the horizontal surface;
- the tray control component automatically moves the tray from the second position back to the first position in response to the weight data indicating the set of items removed from the tray;
- wherein the gearing mechanism is mounted to a side panel of the display case;
- wherein the gearing mechanism is mounted to a top panel of the display case;
- wherein the operating mechanism comprises a lever which moves up and down;
- wherein the operating mechanism comprises a turn crank which turns clockwise or counterclockwise;
- wherein the gearing mechanism further comprises an electric motor;
- wherein the operating mechanism engages the electric motor to move the support arm along the range of motion in response to activation of the operating mechanism.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11 and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11 and FIG. 12, or an entity (e.g., device, processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11 and FIG. 12.

In some examples, the operations illustrated in FIG. 13 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of automatically raising or lowering the tray.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for extending a service surface device associated with a display case. For example, the elements illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, such as when encoded to perform the operations illustrated in FIG. 13, constitute exemplary means for activating the gearing mechanism to move the tray along the range of motion from the first position to the second position in response to detecting an increase in weight associated with at least one item placed on the horizontal surface; and automatically moving the tray from the second position back to the first position in response to the weight data indicating the set of items removed from the tray.

Other non-limiting examples provide one or more computer storage devices having a first computer-executable instructions stored thereon for providing an extendable service surface tray. When executed by a computer, the computer performs operations including activating the gearing mechanism to move the tray along the range of motion from the first position to the second position in response to detecting an increase in weight associated with at least one item placed on the horizontal surface; and/or activating the gearing mechanism to automatically move the tray from the second position back to the first position in response to the weight data indicating the set of items removed from the tray.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for extending a height adjustable service surface, the system comprising:

a display case comprising a side panel, a top panel and a front panel;

a gearing mechanism mounted to the side panel, the gearing mechanism comprising a set of gears;

an operating mechanism associated with the gearing mechanism;

at least one support arm mounted to the gearing mechanism configured to rotate along a range of motion;

a tray comprising an attachment member associated with a first end of the at least one support arm; and a horizontal top surface of the tray configured to support a set of items at least partially in contact with the top surface as the tray moves along the range of motion, wherein the tray is configured to have a first position at a first height over a top of the display case, and have a second position at a second height associated with a stop point in front of an exterior side of the front panel of the display case, the second height being lower than the first height, the tray moving along the range of motion from the first position to the second position while maintaining the horizontal top surface in response to activation of the operating mechanism.

2. The system of claim 1, wherein the operating mechanism is a lever having a first lever position and a second lever position, wherein the tray rotates along the range of motion as the lever moves from the first lever position to the second lever position.

3. The system of claim 1, wherein the gearing mechanism further comprises:

an electric motor, wherein the electric motor engages to move the at least one support arm along the range of motion in response to activation of the operating mechanism.

4. The system of claim 1, wherein the operating mechanism is a button which engages an electric motor to automatically move the tray from the first position to the second position of the tray.

5. The system of claim 1, further comprising:

a set of weight sensors associated with the tray, wherein the set of weight sensors generates weight data associated with the set of items.

6. The system of claim 5, further comprising:

a tray control component, implemented on at least one processor, the tray control component activates the gearing mechanism to move the tray along the range of motion from the first position to the second position of the tray in response to detecting an increase in weight associated with at least one item placed on the horizontal top surface; and the tray control component automatically moves the tray from the second position back to the first position in response to the weight data indicating the set of items removed from the tray.

7. An extendable service surface device associated with a display case, the extendable service surface device comprising:

an operating mechanism associated with a gearing mechanism;

a tray, the tray comprising a top surface configured to support a set of items at least partially in contact with the top surface;

a tray support mechanism, the tray support mechanism comprising at least one support arm, the at least one support arm comprising a first end attached to the gearing mechanism and a second end attached to a first side of the tray, the at least one support arm configured to rotate along a range of motion outside of the display case, the range of motion including a first position of the tray over a top of the display case and a second position of the tray at a stop point in front of the display case, wherein the operating mechanism rotates the tray via the tray support mechanism along the range of motion while maintaining the top surface parallel to a ground surface in response to activation of the operating mechanism.

8. The extendable service surface device of claim 7, wherein the gearing mechanism is mounted to a side panel of the display case.

9. The extendable service surface device of claim 7, wherein the gearing mechanism is mounted to a top panel of the display case.

10. The extendable service surface device of claim 7, wherein the operating mechanism comprises a lever.

11. The extendable service surface device of claim 7, wherein the operating mechanism comprises a turn crank.

12. The extendable service surface device of claim 7, wherein the gearing mechanism further comprises an electric motor, wherein the operating mechanism engages the electric motor to move tray support mechanism along the range of motion in response to activation of the operating mechanism.

13. The extendable service surface device of claim 7, further comprising:

a set of weight sensors associated with the tray, wherein the set of weight sensors generates weight data associated with the set of items;

a tray control component, implemented on at least one processor, the tray control component activates the gearing mechanism to move the tray along the range of motion from the first position to the second position in response to detecting an increase in weight associated with at least one item placed on a horizontal top surface; and the tray control component automatically moves the tray from the second position back to the first position in response to the weight data indicating the set of items removed from the tray.

14. An extendable service surface device comprising:

a gearing mechanism mounted to a side panel of a display case, the gearing mechanism comprising a set of gears;

an operating mechanism associated with the gearing mechanism;

a tray including a horizontal top surface configured to support a set of items at least partially in contact with the horizontal top surface; and at least one support member affixed to the tray and the gearing mechanism, wherein responsive to activation of the operating mechanism the gearing mechanism moves the at least one support member along a range of motion to adjust a height of the tray, the range of motion including a first position disposing the tray at a first height over a top of the display case and a second position disposing the tray at a second height associated with a stop point in front of an exterior portion of a front panel of the display case.

15. The extendable service surface device of claim 14, wherein the gearing mechanism further comprises an electric motor, wherein the operating mechanism engages the electric motor to move the at least one support member along the range of motion in response to activation of the operating mechanism.

16. The extendable service surface device of claim 14, further comprising:

a set of weight sensors associated with the tray, wherein the set of weight sensors generates weight data associated with the set of items;

a tray control component, implemented on at least one processor, the tray control component activates the gearing mechanism to move the tray along the range of motion from the first position to the second position in response to detecting an increase in weight associated with at least one item placed on the horizontal top surface; and the tray control component automatically moves the tray from the second position back to the first position in response to the weight data indicating the set of items removed from the tray.

* * * * *